3,402,366
BEAM SCANNING IN INJECTION LASERS
Howard B. Williams and Bankim R. Shah, Poughkeepsie, N.Y., assignors to International Business Machines Corporation, New York, N.Y., a corporation of New York
Filed Feb. 26, 1965, Ser. No. 435,476
9 Claims. (Cl. 331—94.5)

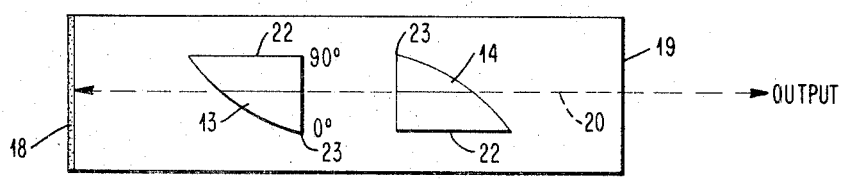
FIG. 1
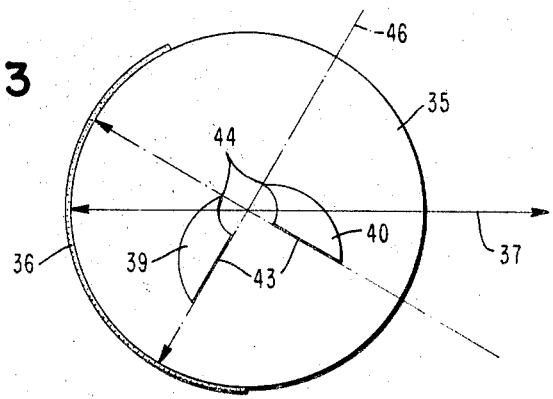
FIG. 3
FIG. 2
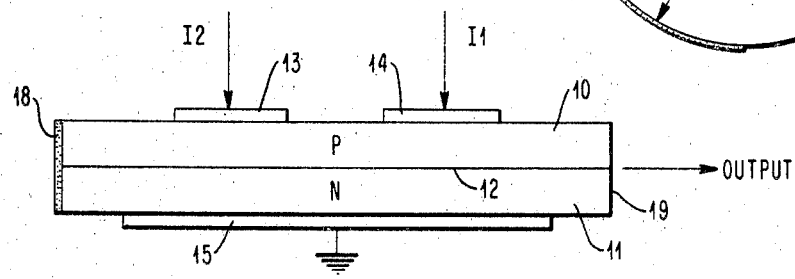
FIG. 4
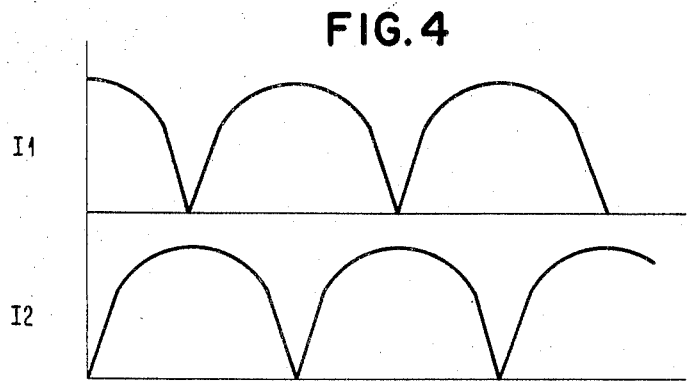
INVENTORS
HOWARD B. WILLIAMS
BANKIM R. SHAH
BY W. S. Robertson
ATTORNEY

This invention relates generally to electro optical devices, more specifically to an injection semiconductor laser constructed to provide a sweeping or scanning output beam.

Although the semiconductor laser has become well known, it will be helpful to review the principles that particularly apply to this invention. When an electron goes from a high energy level to a low energy level, a photon is produced having a frequency that depends on the difference between the two levels. In all materials electrons shift back and forth between levels converting the thermal energy to radiant energy. In some materials a high energy level electron is triggered to return to a low energy level state when it is hit by a photon of the frequency corresponding to the energy difference. When this occurs, two photons appear that are in phase (coherent).

A semiconductor laser is constructed so that there is a fairly high chance that a photon inside the material will strike another high energy electron and thereby produce further photons; from the opposite point of view the laser is constructed to reduce the chance that a photon will escape from the material without striking a high energy electron, or that the photon will only produce thermal energy within the laser material.

Some more detailed factors that establish whether lasing will occur will be summarized next. In the device of this invention these factors are controlled so that the line where lasing can occur is made to sweep.

The semiconductor body of the laser, which is called a cavity, has some of its surfaces polished or silvered so that photons are reflected internally. This makes a photon travel farther within the cavity before it escapes and thereby increases the chances that the photon will collide with a high energy level electron. Sometimes other surfaces are roughened so that lasing cannot occur along some lines within the cavity. In the device of this invention this effect is used to establish a family of lines where lasing may occur, and an effect that will be explained later is controlled to establish the particular line that lasing occurs on. In one specific embodiment the laser cavity has two flat parallel ends that are polished so that lasing may occur only on any line of a family of parallel lines perpendicular to the two surfaces. In another embodiment the laser cavity has cylindrical sides polished so that lasing can occur only on some radii of the cylinder.

As has already been mentioned, lasing occurs only when there are enough electrons in the high energy level that as many photons are gained as are lost. In a semiconductor laser high energy level electrons are provided by current applied to the laser junction and the current can be modulated to establish or extinguish lasing. Considered in more detail, the effect of the current is to establish a region of high probability of producing additional photons. At a threshold current value more photons are produced than are lost and the light output increases abruptly. Where the contact does not extend along the full length of the cavity, lasing occurs when the photon gain in the region under the contact is high enough to make up for the losses within this region and also for the higher losses in the region outside the contact. In the device of this invention the effective length of the contact is made to vary with respect to time along the family of lines of possible lasing to make the beam sweep.

In the device of this invention the effective length of the contacts is controlled by forming two contacts spaced apart in the direction of lasing so that currents of both contacts contribute to lasing. Each contact is shaped so that it presents a different length along each of the lines of possible lasing. The shapes of the two contacts are somewhat complementary so that where one provides only a short length in a direction of lasing, the other provides a longer length. Separate time varying current wave forms are applied to the two contacts, and these wave forms are shaped with respect to the contacts so that the contact lengths and current values are appropriate for lasing only along a unique line of the family of lines established by the reflecting surfaces.

The detailed description of two embodiments of the invention will suggest other goals of optical devices of this general type, problems in achieving these goals, and corresponding objects and features of this invention.

*The drawing*

FIG. 1 is a plan view of the semiconductor laser of one embodiment of this invention with the plane of the junction parallel to the plane of the drawing.

FIG. 2 is a front view of the semiconductor laser of FIG. 1 with the plane of the punction perpendicular to the drawing.

FIG. 3 is a plan view of the semiconductor laser of a second embodiment of this invetion oriented similarly to FIG. 1.

FIG. 4 shows current wave forms that are suitable for energizing the lasers of either embodiment of this invention.

The semiconductor laser shown in FIGS. 1 and 2 comprises a body of semiconductor material having a P region 10, an N region 11, and a junction 12 along which lasing occurs. Two contacts 13 and 14 are attached to one of the regions, arbitrarily P region 10, and suitable contact making means illustrated as a single contact 15 is attached to the other region. As arrowed lines in the drawing illustrate, terminals 13 and 14 are suitably connected to means for supplying individual currents $I_1$ and $I_2$. When the currents $I_1$ and $I_2$ reach a threshold value as explained later, lasing occurs along the plane of the junction 12. The laser has its opposite ends 18 and 19 polished so that a photon traveling along representative line 20 in FIG. 1 or a parallel line is internally reflected and lasing can be established easily along the family of these lines. The light output occurs from end 19, and end 18 is preferably silvered as the speckled region in the drawing represents.

As FIG. 1 shows, the two contacts 13, 14 have approximately (but not exactly) complementary lengths in the direction of lasing. The contact lengths are coordinated with the current wave forms so that the threshold condition is met along a single line. The exact shape of the contacts can be best explained in terms of the operation of the laser.

FIG. 4 shows the wave forms of the two currents $I_1$ and $I_2$ that are applied to contacts 13 and 14. Current wave form $I_1$ is a full wave rectified cosinusoid and wave form $I_2$ is a full wave rectified sinusoid. These wave forms were chosen because they are simple to generate by means of well known circuits and because of the unique relationship of the contacts and the wave forms that will be described now. As has already been explained, the threshold for lasing is a function of the contact current and contact lengths in the direction of lasing. For a laser with multiple contacts the threshold for lasing is a function of the sum of the products of current and length for each contact. When FIG. 1 is viewed with the right-hand edge of the drawing uppermost contact 13 can be recognized as the first 90° of a sinusoid. The numbers zero and 90° are marked on FIG. 1 to indicate a time coordinate. Similarly from this viewpoint the length of contact 14 is a cosinusoidal function of the time axis in FIG. 1. Thus the product of current and length for contact 14 is $I_1L_0 \sin^2 \omega t$ and the product of current and length for contact 13 is a corresponding $\cos^2$ function of time. By the trigonometric identity $\sin^2 + \cos^2 = 1$ the sum of the current and length products for the two contacts is a constant. The maximum lengths along edges 22 and maximum currents $I_1$ and $I_2$ are coordinated to make the threshold for lasing exist along a unique line that sweeps between edges 22 as a function of time. In the laser of FIG. 1 the maximum length along an edge 22 is aligned with a point 23 of substantially zero length. Thus the maximum current values $I_1$ and $I_2$ are the appropriate value to produce lasing along an edge 22 when only one contact 13 or 14 is energized.

A second embodiment of this invention shown in FIG. 3 includes a cylindrical body 35 of semiconductor material having P and N regions and a junction as described in connection with FIG. 2 for the laser of the first embodiment. A portion of the cylindrical surface 36 is silvered as the speckled area in the drawing represents so that internal reflections occur on radii of the cylinder and the light output appears on a family of radial lines to the right illustrated by line 37. The laser of FIG. 3 has two contacts 39, 40 on its uppermost surface. The contacts 39, 40 are shaped to have sinusoidal and cosinusoidal lengths as a function of the angle. The parallel between FIG. 3 and FIG. 1 can be seen by comparing the longest edges 43 of contacts 39, 40 with the corresponding edges 22 in FIG. 1 and by comparing the points 44 of substantially zero length in the direction of lasing with the corresponding points 23 in FIG. 1. There is a one to one equivalence of length of contacts 39, 40 along radii to the lengths of contacts 13, 14 along horizontal lines in FIG. 1. When the wave forms of FIG. 4 are applied to contacts 39, 40, a light beam is produced that sweeps radially between the radius of edge 43 of contact 40 and a radius 46 opposite to edge 43 of contact 39.

To generalize the requirements for lasing along a unique line of a family of permissible lines, the sums of the product of current and contact length are made to equal a threshold value and the lengths are shaped for a particular wave form. As special cases either the sum of the currents or the sum of the lengths can be kept a constant. The contact shapes and current wave forms in the discussion so far have been selected to produce a sweeping action in which either the position or the angle of the beam is a linear function of time. The wave forms of FIG. 4 or the contacts can be stretched (so long as the current amplitudes are properly related) or the currents can be made discontinuous to provide differing sweep configurations.

From the two embodiments of the invention described in detail and from the specific suggestions for variations, those skilled in the art will recognize a variety of applications and modifications within the scope of the claims.

What is claimed is:
1. A laser comprising:
   a device of the type that produces lasing as a function of current applied to the device and the arrangement of reflective surfaces of the device;
   said reflecting surfaces being arranged to produce a lasing along any of a plurality of lines; and
   two contact means for applying differing current wave forms to said device, said contact means being spaced apart in the direction of lasing whereby the one of said lines where lasing is established is a function of the length of each contact means along said lines and the current applied to each said contact means;
   each said contact means being shaped to have a differing length along each said line and the lengths of said two contact means along a common line being related whereby lasing may occur along a selected one of said lines in response to a unique pair of current values applied to said first and second contact means.

2. A laser according to claim 1 in which said reflecting surfaces are arranged to provide lasing along a substantially continuous family of lines.

3. A laser according to claim 2 in which said device has two parallel reflective surfaces establishing a family of parallel lines where lasing may occur.

4. A laser according to claim 3 in which said two contact means comprise a first contact having a length in the direction of lasing that is a sine function and a second contact having a length in the direction of lasing that is a cosine function whereby a rectified sine wave current wave form applied to said first contact and a rectified cosinusoid current wave form applied to said second contact cause the line of lasing to sweep through said family.

5. A laser according to claim 4 in which said contacts each have points of substantially zero length in the direction of lasing aligned with points of maximum length on the other contact.

6. A laser according to claim 5 in which said first and second contacts have the shape of the first one quarter cycle of a sine wave and a cosine wave respectively.

7. A laser according to claim 5 in which said device is a semiconductor device having a junction where lasing occurs in response to a threshold current flowing across the junction.

8. A laser according to claim 2 in which said device has cylindrical reflecting surfaces whereby lasing may be established on radii of a cylinder.

9. A laser according to claim 8 in which said two contact means comprise a first contact having a length in the direction of lasing that is a sine function of the angle of the line of lasing and a second contact having a length in the direction of lasing that is a cosinusoidal function of the angle of the line.

References Cited

UNITED STATES PATENTS

| | | | |
|---|---|---|---|
| 3,344,365 | 9/1967 | Lewis | 331—94.5 |
| 3,363,195 | 1/1968 | Furnange | 331—94.5 |

JEWELL H. PEDERSEN, *Primary Examiner.*

E. S. BAUER, *Assistant Examiner.*